United States Patent
Shankarraman

(10) Patent No.: US 10,075,481 B2
(45) Date of Patent: Sep. 11, 2018

(54) REAL-TIME PLACESHIFTING OF MEDIA CONTENT TO PAIRED DEVICES

(71) Applicant: ECHOSTAR TECHNOLOGIES L.L.C., Englewood, CO (US)

(72) Inventor: Girish Shankarraman, Littleton, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 15/299,691

(22) Filed: Oct. 21, 2016

(65) Prior Publication Data
US 2017/0041351 A1 Feb. 9, 2017

Related U.S. Application Data

(63) Continuation of application No. 13/909,895, filed on Jun. 4, 2013, now Pat. No. 9,497,231.

(51) Int. Cl.
*G06F 15/16* (2006.01)
*H04L 29/06* (2006.01)
*H04L 29/08* (2006.01)

(52) U.S. Cl.
CPC ...... *H04L 65/1069* (2013.01); *H04L 65/4076* (2013.01); *H04L 65/4084* (2013.01); *H04L 65/601* (2013.01); *H04L 67/104* (2013.01); *H04L 67/2804* (2013.01); *H04L 67/24* (2013.01); *H04L 69/04* (2013.01)

(58) Field of Classification Search
CPC ............ H04L 65/1069; H04L 65/4076; H04L 65/4084; H04L 65/601; H04L 67/104; H04L 67/2804

USPC ......................................................... 709/228
See application file for complete search history.

(56) References Cited

U.S. PATENT DOCUMENTS

| | | | |
|---|---|---|---|
| 6,097,441 A | 8/2000 | Allport | |
| 8,350,971 B2 | 1/2013 | Malone et al. | |
| 8,646,013 B2 | 2/2014 | Curtis et al. | |
| 8,686,013 B2 * | 4/2014 | Lyga | A61K 8/49 514/374 |
| 2010/0064332 A1 | 3/2010 | Krikorian et al. | |
| 2010/0082567 A1 | 4/2010 | Rosenblatt et al. | |
| 2010/0268832 A1 | 10/2010 | Lucas et al. | |
| 2012/0278837 A1 * | 11/2012 | Curtis | H04N 21/8126 725/42 |
| 2014/0109144 A1 * | 4/2014 | Asnis | H04N 21/43615 725/48 |
| 2014/0281006 A1 | 9/2014 | Major et al. | |

* cited by examiner

*Primary Examiner* — Kristie Shingles
(74) *Attorney, Agent, or Firm* — Lorenz & Kopf, LLP

(57) ABSTRACT

Methods, devices, and systems are provided for placeshifting a media program. An exemplary method involves a media device storing identification information for a client device coupled to a network and receiving a request to transfer a media program available for presentation on a primary display device in a first format via the media device. In response to the request, a peer-to-peer communication session with the client device over the network is established using the identification information and an encoded content stream corresponding to the media program is transferred to the client device via the peer-to-peer communication session.

19 Claims, 7 Drawing Sheets

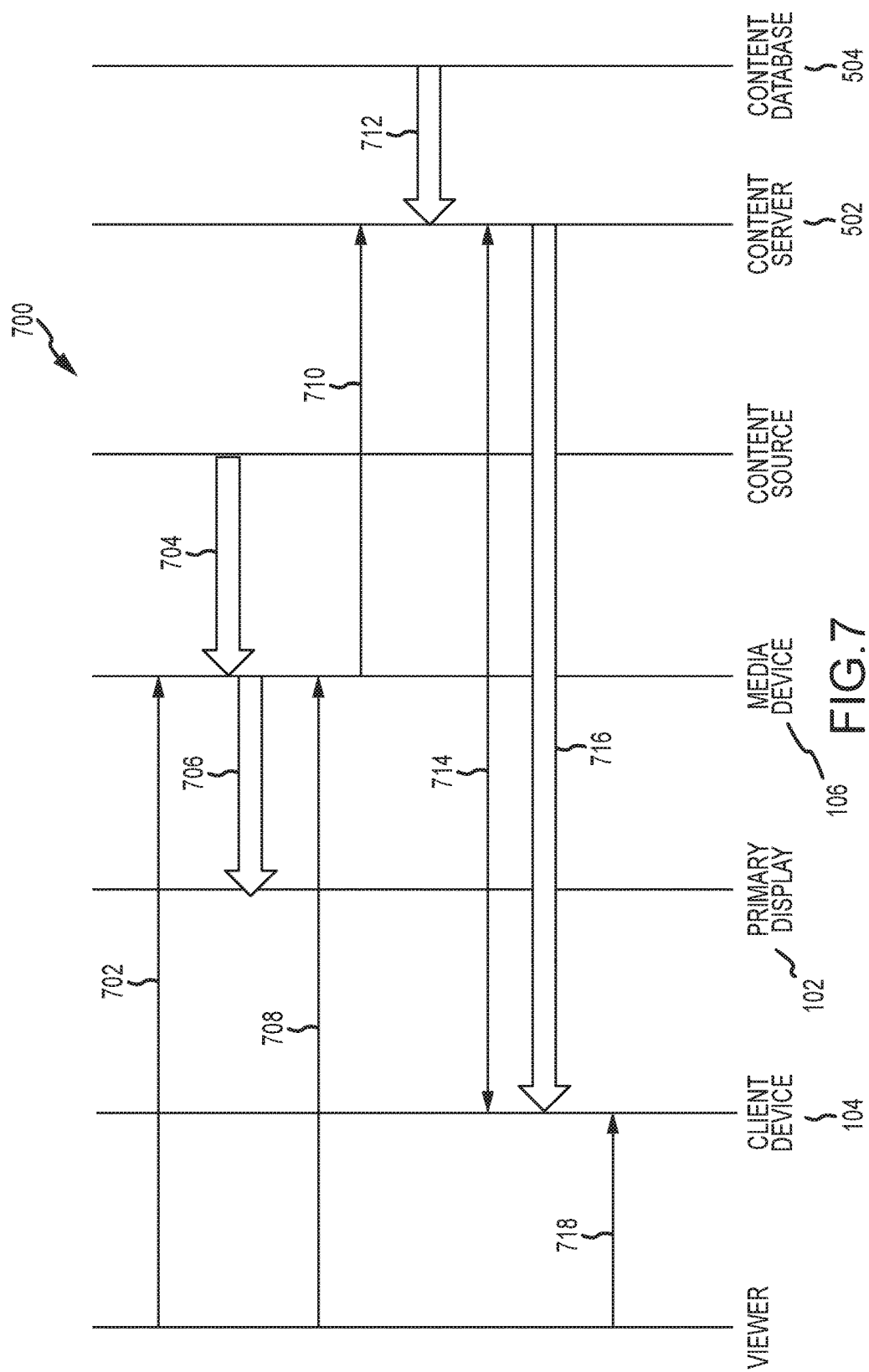

REAL-TIME PLACESHIFTING OF MEDIA CONTENT TO PAIRED DEVICES

CROSS-REFERENCE TO RELATED APPLICATIONS

This application is a continuation of U.S. patent application Ser. No. 13/909,895, filed Jun. 4, 2013.

TECHNICAL FIELD

The following description generally relates to providing media content to a secondary display device during a placeshifting session initiated while media content is presented on a primary display device.

BACKGROUND

Media content can now be received from any number of different sources. Broadcast television content, for example, can typically be received at set-top box (STB) or other receiver that receives a direct broadcast satellite (DBS), cable and/or terrestrial broadcast signal, and such received content may also be stored in a personal or digital video recorder (DVR) or the like for viewing at a later time ("time shifting"). Live or recorded content can also be "place-shifted" to allow viewing at remote locations away from the viewer's primary television set. Due to the proliferation of portable consumer electronic devices with display and network communication capabilities, viewers have more opportunities to placeshift content. Additionally, consumer expectations are likely to increase over time based on their perception of the current state of technological advances. Accordingly, is now desirable to create systems and methods for placeshifting media content in an expeditious manner with reduced manual interaction to provide a more satisfactory user experience. Other desirable features and characteristics may also become apparent from the subsequent detailed description and the appended claims, taken in conjunction with the accompanying drawings and this background section.

BRIEF SUMMARY

According to various exemplary embodiments, systems, devices and methods are provided for placeshifting a media program available for presentation on a primary display device in a first format via a media device coupled to the primary display device. One exemplary method involves the media device storing identification information for a client device coupled to a network, receiving a request to transfer the media program, and in response to the request, establishing a peer-to-peer communication session with the client device over the network using the identification information and transferring an encoded content stream corresponding to the media program that has a format different from the first format to the client device via the peer-to-peer communication session.

In other embodiments, an apparatus for a media device is provided. The media device includes a first interface configured to provide a first content stream that corresponds to a media program and has a first format to a primary display device, a network interface configured to communicate via a network, a data storage element configured to maintain identification information for a client device communicatively coupled to the network, and an input element configured to receive a placeshifting request. The media device also includes a control module coupled to the data storage element, the input element, and the network interface, wherein in response to the placeshifting request, the control module is configured to establish a peer-to-peer communication session with the client device over the network using the identification information and transfer a second content stream that corresponds to the media program and has a second format different from the first format to the client device via the peer-to-peer communication session.

In another embodiment, a method of placeshifting a media program involves associating a client device with a media device coupled to a primary display device, providing the media program to the primary display device via the media device, detecting, by the media device, a placeshifting request gesture while providing the media program to the primary display device, and in response to the placeshifting request gesture, establishing a peer-to-peer communication session with the client device over a network based on the association with the media device and providing the media program to the client device over the network via the peer-to-peer communication session.

Various embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of a media system in accordance with one or more embodiments;

FIG. 7 is a diagram illustrating a sequence of communications within the media system of FIG. 5 in accordance with one exemplary embodiment of the server placeshifting process of FIG. 6.

DETAILED DESCRIPTION

Figure 1:
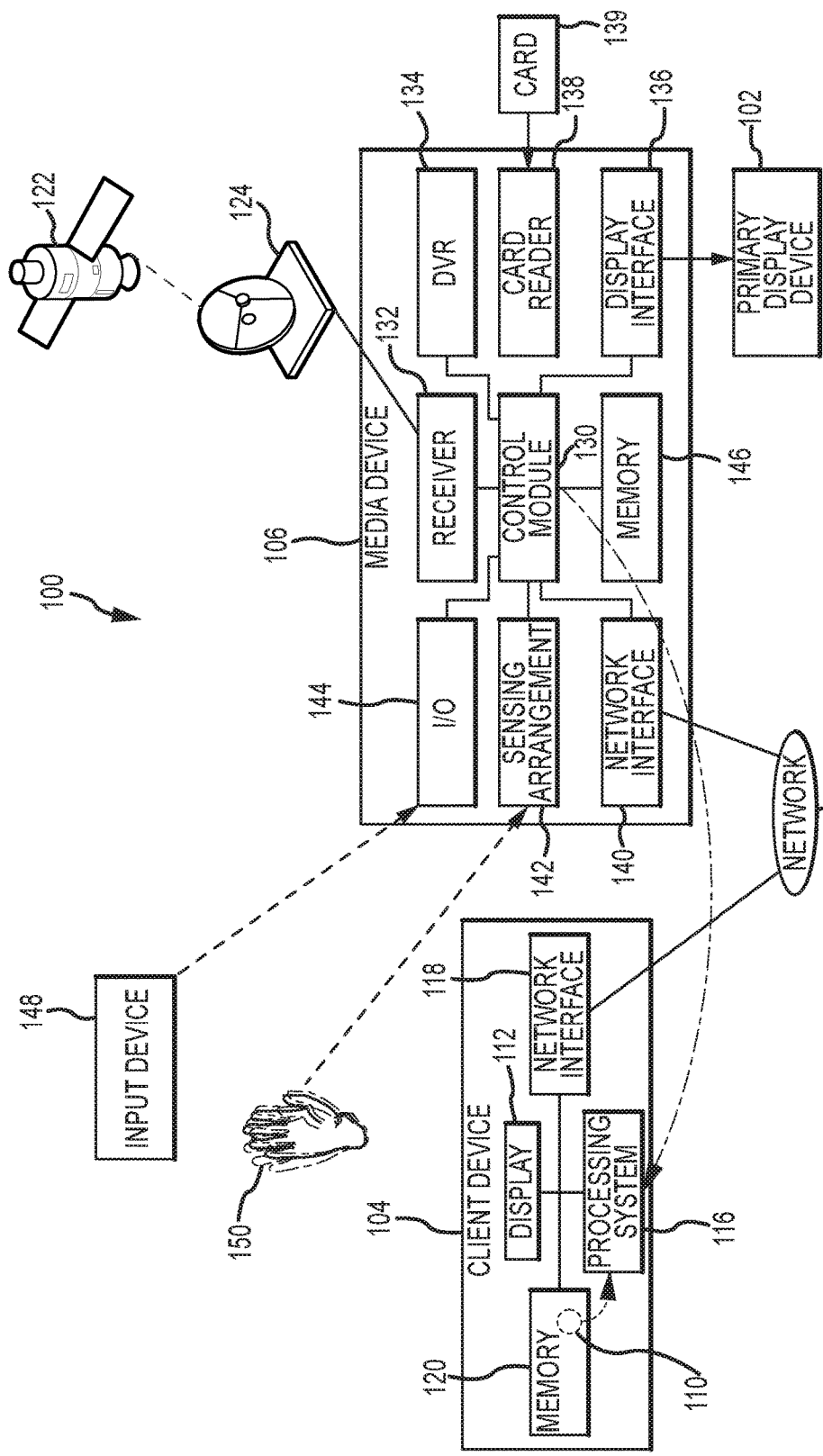

The following detailed description of the invention is merely exemplary in nature and is not intended to limit the invention or the application and uses of the invention. Furthermore, there is no intention to be bound by any theory presented in the preceding background or the following detailed description.

Embodiments of the subject matter described herein generally relate to placeshifting media content available for presentation on a primary display device, such as a television, to a secondary display device, such as a portable electronic device, substantially in real-time and on-demand with reduced manual overhead and delay. As used herein, "media content," "media program," or variants thereof should be understood as referring to any audio, video, audio/visual or other programming in any streaming, file-based or other format. As described in greater detail below, a media device associated with the primary display device establishes an association (or pairing) with the secondary display device. In response to receiving a placeshifting request, the media device utilizes the association to establish a peer-to-peer communication session with the paired secondary display device. Thereafter, the media device initiates a transfer of the media content currently being presented (or otherwise selected for presentation) on the primary display device to the secondary display device via the peer-to-peer communication session in an automated manner In other words, the peer-to-peer communication session is established and the placeshifting session via the peer-to-peer communication session is initiated without requiring additional manual interaction beyond the manual interaction to provide the placeshifting request. In one or more embodiments, the media device includes a sensing arrangement capable of detecting gestures by a person in the vicinity of the media device (e.g., a viewer of the primary display device), wherein the media device identifies the placeshifting request in response to recognizing a gesture detected by the sensing arrangement as matching a designated placeshifting request gesture. Thus, a viewer of the primary display device may initiate placeshifting to a secondary display device by simply making a gesture without having to manipulate a user input interface of the media device (e.g., a remote control or the like) and/or a user input interface of the secondary display device (e.g., a keypad or the like) to facilitate the placeshifting.

As described in greater detail below in the context of FIGS. 1-4, in accordance with one or more embodiments, the media device scans or otherwise accesses a local network to detect the presence of the secondary display device in the vicinity of the media device and/or primary display device. In response to discovering the secondary display device, the media device obtains, from the secondary display device, unique identification information for the secondary display device on the local network and stores that identification information to maintain an association with the secondary display device. Thereafter, the media device provides a media program to the primary display device for presentation to a viewer. In response to receiving a placeshifting request from a viewer of the primary display device, the media device identifies the secondary display device as the desired destination for the media program and utilizes the identification information to automatically establish a peer-to-peer communication session via the local network with a placeshifting application on the secondary display device. Thereafter, the media device initiates a placeshifting session with the placeshifting application and automatically transfers or otherwise transmits, via the peer-to-peer communication session, a content stream corresponding to the media program being provided to the primary display device. In this regard, in response to receiving the placeshifting request, the media device may encode the media program substantially in real-time or on-the-fly in an appropriate format for communication over the network and subsequent presentation by the secondary display device. Accordingly, the encoded content stream transmitted by the media device has a different encoding format than the content stream provided to the primary display device.

In other embodiments, as described in greater detail below in the context of FIGS. 5-7, in response to receiving a placeshifting request from a viewer of the primary display device, the media device identifies the secondary display device as the desired destination for the media program and automatically transmits or otherwise provides stored identification information for the secondary display device to a content server along with an indication of the media program being provided to the primary display device at the time the placeshifting request was received. Thereafter, the content server utilizes the received identification information to automatically establish a peer-to-peer communication session with a placeshifting application on the secondary display device via a network. The content server then initiates a placeshifting session with the placeshifting application and automatically transfers or otherwise transmits a content stream corresponding to the media program presented on the primary display device. Again, the content stream provided by the content server to the secondary display device is encoded using an appropriate encoding format for communication over the network and subsequent presentation by the secondary display device, which may be different from the encoding format of the content stream provided to the primary display device.

FIG. 1 depicts a media system 100 configured to support transferring or otherwise placeshifting a media program (or media content) available for presentation on a primary display device 102, such as a television, to a secondary display device 104 that has been previously paired with a media device 106 associated with the primary display device 102. The secondary display device 104 may be realized as any sort of electronic device capable of playing or otherwise presenting media content, such as a mobile telephone, a laptop or notebook computer, a tablet computer, a desktop computer, a personal digital assistant, a video game player, a portable media player and/or any other media playback device capable of rendering media content received via a network 108. For convenience, but without limitation, the secondary display device 104 may alternatively be referred to herein as a client device.

As described in greater detail below, the media device 106 communicates with the client device 104 via the network 108 and stores or otherwise maintains information identifying the client device 104 to establish a pairing (or association) with the client device 104. Thereafter, in response to receiving a request to transfer or placeshift a media program available for presentation on the primary display device 102 to the client device 104, the media device 106 utilizes the stored identification information for the client device 104 to automatically establish a peer-to-peer communication session 109 with the client device 104 via the network 108 and automatically transfer the media program to the client device 104 via the peer-to-peer communication session 109. In exemplary embodiments, the media device 106 provides or otherwise furnishes the media program to the primary display device 102 as a media content stream having a format that is capable of being decoded and/or presented by the primary display device 102. In response to the receiving the placeshifting request, the media device 106 automatically encodes (or transcodes) the media program into a different format suitable for transmission via the network 108 and subsequent decoding and/or presentation by the client device 104 and transfers the media program to the client device 104 by providing the encoded stream directly to the client device 104 via the peer-to-peer communication session 109. For example, when the primary display device 102 is realized as a digital television, the media device 106 may provide the media program to the primary display device 102 in an uncompressed video format (e.g., an uncompressed encoding format in accordance with the high-definition multimedia interface (HDMI) specification), and in response to the placeshifting request, encode the media program to the H.264 encoding format (e.g., MPEG-4 Part 10 or Advanced Video Coding) before transferring the media program to the client device 104.

In exemplary embodiments, the client device 104 includes or otherwise executes a media placeshifting application (or process) 110 configured to support establishing the peer-to-peer communication session 109 with the media device 106 via the network 108 and receiving the encoded media content stream from the media device 106 via the peer-to-peer communication session 109. The placeshifting application 110 is configured to allow the peer-to-peer communication session 109 to be automatically established with the media device 106 without any manual interaction, which, in turn, allows the media device 106 to automatically transfer the media program to the client device 104 via the network 108 without any additional manual interaction after the placeshifting request is received by the media device 106. Thereafter, the placeshifting application 110 may decode the received media content stream and present the media program on the display 112 associated with the client device 104, or alternatively, store the media program on the client device 104 for subsequent presentation on the display 112.

As illustrated in FIG. 1, the client device 104 includes a processing system 116 that is coupled to the display 112 and a networking interface 118, wherein the processing system 116 is configured to execute or otherwise support the placeshifting application 110 and additional processes, tasks, functions, and/or operations described in greater detail below. The processing system 116 may be realized using any suitable processing system and/or devices, such as, for example, one or more processors, central processing units (CPUs), graphics processing units (GPUs), controllers, microprocessors, microcontrollers, processing cores and/or other computing resources configured to support the subject matter described herein. In exemplary embodiments, the client device 104 includes a data storage element (or memory) 120 that is coupled to or otherwise accessed by the processing system 116. The memory 120 may be realized using as random access memory (RAM), read only memory (ROM), flash memory, magnetic or optical mass storage, or any other suitable configuration of non-transitory short or long term data storage or other non-transitory computer-readable media capable of storing programming instructions for execution by the processing system 116. The stored programming instructions, when read and executed by the processing system 116, cause processing system 116 to create, generate, or otherwise facilitate the placeshifting application 110 that supports the placeshifting process 200 described in greater detail below in the context of FIG. 2.

The display 112 generally represents the component, hardware or the like of the client device 104 that is capable of displaying, rendering, or otherwise presenting media content and/or other imagery that is received by or otherwise stored on the client device 104. In this regard, the display 112 may be realized as a monitor, screen, or another conventional electronic display device capable of graphically presenting media content and/or other imagery.

The networking interface 118 generally represents the component, hardware or the like of the client device 104 that facilitates communications with the network 108. In this regard, the network 108 may be realized as any communications network capable of supporting transmission of data and/or information via a peer-to-peer communication session 109 between devices 104, 106. For example, in one embodiment, the network 108 may be realized as a wireless local area network (WLAN) (e.g., in accordance with one or more of the IEEE 802.11 standards) that supports the transmission control protocol and/or internet protocol (TCP/IP) or other conventional protocols, in which case the networking interface 118 is realized as a wireless adapter, a wireless transceiver, a wireless network interface controller, or the like. In another embodiment, the network 108 is realized as a wireless personal area network (PAN) or another suitable short range network, such as, for example, a Bluetooth ad-hoc network, in which case the networking interface 118 is realized as a Bluetooth adapter (or transceiver). In yet other embodiments, the network 108 may be realized as a cellular communications network, a wired local area network, the Internet, or the like, in which case, the networking interface 118 may be realized as a cellular transceiver, a wired network interface controller (e.g., an Ethernet adapter), or the like. That said, in exemplary embodiments described herein in the context of FIGS. 1-4, the network 108 is realized as a local network that supports communications between the media device 106 and other secondary display devices within a vicinity of the media device 106 and/or the primary display device 102, such as a WLAN or a Bluetooth PAN, wherein the networking interface 118 is appropriately realized as a wireless network adapter or a Bluetooth adapter.

Still referring to FIG. 1, in the illustrated embodiment, the media device 106 is any component, hardware or the like capable of receiving and processing media content and providing media content to the primary display device 102 for presentation on the primary display device 102. As described above, the primary display device 102 generally represents a television, monitor, liquid crystal display (LCD), light emitting diode (LED) display, plasma display, or the like that graphically presents, renders, or otherwise displays imagery and/or video corresponding to media content provided by the media device 106. In some embodiments, media device 106 is a set-top box (STB) or similar system that is able to receive television programming and/or to record certain media programs. Exemplary embodiments of media device 106 will therefore include a receiver interface 132 for receiving satellite, cable and/or broadcast programming signals from broadcast content sources 122, as well as a data storage medium 134 (e.g., a hard disk, flash memory, or another suitable non-volatile data storage element) to support a digital video recorder (DVR) feature and/or functionality, a display interface 136 for providing imagery and/or video corresponding to a media program to the primary display device 102, one or more input elements (e.g., an input/output interface 144 to a remote control or other user input device 148) for receiving user inputs to media device 106, and a control module 130 that directs, manages, or otherwise controls the operations of the media device 106 as appropriate. For convenience, but without limitation, the data storage medium 134 is alternatively referred to herein as a DVR. In some embodiments, the media device 106 may also include an access card interface or card reader 138 adapted to receive an access card 139 (or viewing card) configured to ensure that the viewer is authorized to view media content provided to the primary display device 102. In this regard, the access card 139 may include includes unique identification information associated with a particular subscriber to the broadcast content source 122 or otherwise include information that facilitates receiving and/or decoding media content provided by the broadcast content source 122.

The network interface 140 generally represents the component, hardware or the like of the media device 106 that facilitates communications with the client device 104 via the network 108. Accordingly, depending on the embodiment, the network interface 140 may be realized as a wireless adapter, a wireless transceiver, a wireless network interface controller, a Bluetooth adapter (or transceiver), a cellular transceiver, a wired network interface controller (e.g., an Ethernet adapter), or the like as appropriate. That said, in exemplary embodiments described herein in the context of FIGS. 1-4, the network interface 140 is realized as a wireless network adapter or a Bluetooth adapter that facilitates communications via a local network with secondary display devices within a vicinity of the media device 106 and/or the primary display device 102. It should be noted that in some embodiments, the frequencies utilized by the networking interface 140 are different from the frequencies utilized by the I/O interface 144. In this regard, the networking interface 140 may operate on an unlicensed radio band (e.g., 2.4 GHz carrier frequency) while the I/O interface 144 operates at a lower frequency, such as, for example, consumer infrared (e.g., carrier frequency in the range of about 30 kHz to about 60 kHz).

In exemplary embodiments, input elements to the media device 106 also include a sensing arrangement 142 that is capable of sensing, measuring, or otherwise detecting an environmental condition proximate to or otherwise in the vicinity of the media device 106 and/or the primary display device 102. For example, in one embodiment, the sensing arrangement 142 is realized as a motion sensing arrangement (or motion sensor) that is configured to sense, measure, or otherwise detect physical motions or gestures 150 by the viewer of the primary display device 102 or other users in the vicinity of the media device 106 and/or the primary display device 102. The control module 130 is coupled to the sensing arrangement 142 to receive the output indicative of the environmental condition sensed, measured, detected, or otherwise quantified by the sensing arrangement 142. As described in greater detail below, in accordance with one or more embodiments, the control module 130 analyzes or otherwise processes the output of the sensing arrangement 142 to determine or otherwise identify whether the detected environmental condition (e.g., a particular gesture 150 by a viewer of the primary display device 102) is indicative of a desire to placeshift or otherwise transfer a media program that is concurrently being presented on the primary display device 102 at the time the placeshift request is identified or otherwise received.

It should be appreciated that FIG. 1 depicts merely one exemplary embodiment of a media device 106, and in practice, the media device 106 may be physically and/or logically implemented in any manner to suit the needs of a particular embodiment. In this regard, in some embodiments, the components in media device 106 may be provided within a common chassis or housing as illustrated in FIG. 1, although equivalent embodiments may implement media device 106 with any number of inter-connected but discrete components or systems. For example, in some embodiments, the media device 106 may be realized as a combination of a STB and a placeshifting device, wherein some features of the media device 106 (e.g., the DVR 134, the receiver 132, the display interface 136, I/O interface 144 and/or sensing arrangement 142) are implemented by the STB and other features of the media device 106 (e.g., the network interface 140) are implemented by the placeshifting device, wherein the placeshifting device works in conjunction with the STB to shift the viewing experience from a home television (e.g., primary display device 102) to a viewing display 112 on the client device 104 (e.g., via placeshifting application 110) that is accessed via network 108. Examples of placeshifting devices that may be used in some embodiments of media device 106 could include any of the various SLINGBOX products available from Sling Media of Foster City, Calif., although other products or services could be used in other embodiments. Many different types of placeshifting devices are generally capable of receiving media content from an external source, such as any sort of DVR or STB, cable or satellite programming source, DVD player, content servers, and/or the like. In other embodiments, placeshifting features are incorporated within the same device that provides content-receiving or other capabilities. Media device 106 may be a hybrid DVR and/or receiver, for example, that also provides transcoding and placeshifting features. Examples of conventional placeshifting functions, features, systems and structures are described in United States Patent Publication No. 2006/0095471, although the features described herein could be equivalently applied with any number of other techniques and structures in addition to those described in that particular publication.

Still referring to FIG. 1, in the illustrated embodiment, media device 106 is capable of receiving digital broadcast satellite (DBS) signals transmitted from a broadcast source 122, such as a satellite, using an antenna 124 that provides received signals to the receiver 132. Equivalent embodiments, however, could receive programming at receiver 132 from any sort of cable connection, broadcast source, removable media, network service, external device and/or the like. The DVR 134 feature stores recorded programming (e.g., broadcast programming received via receiver 132) on a hard disk drive, memory, or other storage medium as appropriate in response to user/viewer programming instructions, wherein the recorded programming may be subsequently viewed on primary display device 102 or client device 104 via network 108. Content stored in DVR 134 may be any sort of file-based programming or other content that is accessible to media device 106. Additionally, media content in DVR 134 may be stored in any sort of compressed or uncompressed format, as desired, and may be encoded or transcoded as desired for effective receipt, storage, retrieval and playing.

Control module 130 may be realized as any suitable combination of hardware, firmware, and/or other components of the media device 106 capable of directing, managing or otherwise controlling the operations of media device 106 and supporting the placeshifting process 200 described in greater detail below in the context of FIG. 2. The control module 130 may include one or more processing systems and/or devices, such as, for example, one or more processors, central processing units (CPUs), graphics processing units (GPUs), controllers, microprocessors, microcontrollers, processing cores and/or other computing resources. The media device 106 includes a data storage element (or memory) 146 that is coupled to or otherwise accessed by the control module 130 and stores programming instructions that, when read and executed, cause the control module 130 to perform various tasks, functions, processes and/or operations to control operations of the media device 106 and support the placeshifting process 200 described in greater detail below. In some embodiments, the control module 130 is implemented as a "system on a chip" (SoC) that incorporates a hybrid microcontroller with memory, input/output and other features to perform the various signal processing and other actions of media device 106, and in which case a separate memory 146 may not be provided.

Figure 2:
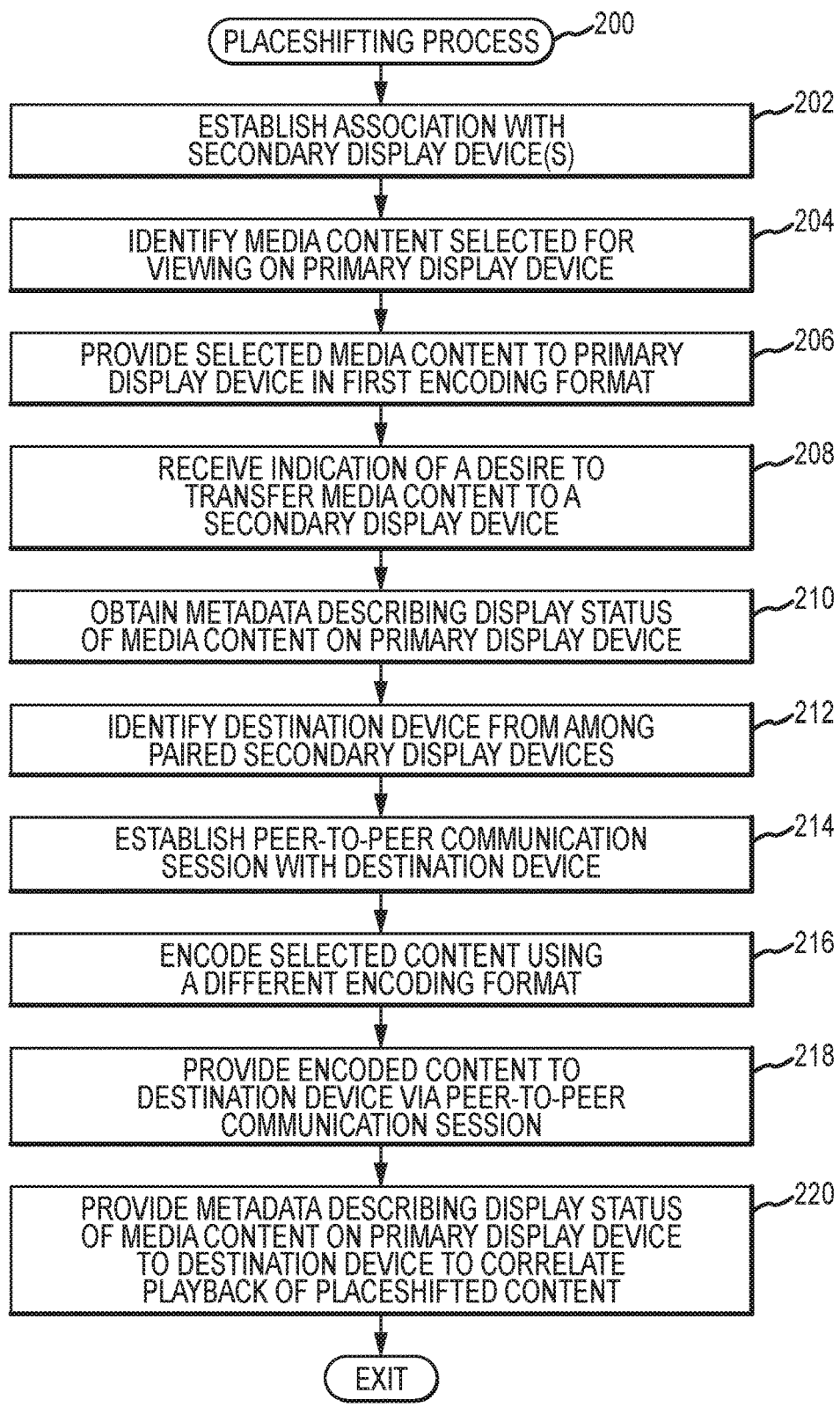
FIG. 2 is a flowchart of an exemplary placeshifting process suitable for use with the media system of FIG. 1.

FIG. 2 depicts an exemplary embodiment of a placeshifting process 200 suitable for implementation by media device in a media system, such as media device 106, to placeshift media content from a primary display device to a secondary display device substantially in real-time or on-demand. The various tasks performed in connection with the illustrated process 200 may be implemented using software, hardware, firmware, or any combination thereof. For illustrative purposes, the following description may refer to elements mentioned above in connection with FIG. 1. In practice, portions of the placeshifting process 200 may be performed by different elements of the media device 106, such as, for example, the control module 130, the receiver interface 132, the display interface 136, the network interface 140, the memory 146, the sensing arrangement 142 and/or the I/O interface 144. It should be appreciated that the placeshifting process 200 may include any number of additional or alternative tasks, the tasks need not be performed in the illustrated order and/or the tasks may be performed concurrently, and/or the placeshifting process 200 may be incorporated into a more comprehensive procedure or process having additional functionality not described in detail herein. Moreover, one or more of the tasks shown and described in the context of FIG. 2 could be omitted from a practical embodiment of the placeshifting process 200 as long as the intended overall functionality remains intact.

Referring to FIG. 2, and with continued reference to FIG. 1, in exemplary embodiments, the placeshifting process 200 begins by pairing or otherwise establishing an association between the media device and one or more secondary devices (task 202). As described in greater detail below in the context of FIG. 3, in exemplary embodiments, the media device 106 detects or otherwise identifies the presence of the client device 104 in the vicinity of the media device 106 via the network 108, for example, by performing a discovery procedure on the network 108 or otherwise scanning the network 108 for other devices. The media device 106 obtains identification information for the client device 104 on the network 108 from the client device 104 via the network 108, and stores or otherwise maintains the identification information for the client device 104 in memory 146. The identification information may include an address of the client device 104 on the network 108, a unique identifier associated with a hardware component of the client device 104 used to access the network 108 (e.g., a Bluetooth address, a media access control address, or the like), a unique identifier associated with the client device 104 (e.g., a mobile phone number, an international mobile station equipment identity number, a unique number assigned to the client device 104 by the media system 100, or the like), and/or model and/or versioning information for the client device 104 (e.g., the type of electronic device, make and/or model of electronic device, firmware version, and the like). The media device 106 may also obtain network authentication information from the client device 104, such as, for example, secure sockets layer (SSL) keys, cryptographic keys, or the like. In this manner, the client device 104 is paired or associated with the media device 106, wherein the media device 106 utilizes the stored identification information and/or authentication information for the paired client device 104 to automatically and securely placeshift media content from the primary display device 102 to the client device 104, as described in greater detail below. In a similar manner, any other secondary display devices in the vicinity of the media device 106 may be paired with the media device 106 to support placeshifting media content from the primary display device 102 to different secondary display devices.

After the media device has been paired with one or more secondary display devices, in exemplary embodiments, the placeshifting process 200 continues by identifying media content selected for viewing on the primary display device and providing the selected media content to the primary display device in a first encoding format (tasks 204, 206). For example, a viewer of the primary display device 102 may manipulate a remote control or other user input device 148 associated with the media device 106 to access a program guide feature provided by the media device 106 and select or otherwise identify a broadcast media program available from the broadcast source 122 for viewing on the primary display device 102. In response, the media device 106 obtains the broadcast stream corresponding to the selected media program from the broadcast source 122 via the receiver 132 and provides that broadcast stream to the primary display device 102 (e.g., via the display interface 136) in the appropriate encoding format. For example, the media device 106 may receive a broadcast stream from the broadcast source 122 in the MPEG-2 encoding format and convert the broadcast stream from the MPEG-2 encoding format to an uncompressed video encoding format (e.g., HDMI) that is provided to the primary display device 102. In response to receiving the broadcast stream, the primary display device 102 renders or otherwise displays the imagery and/or video of the selected broadcast media program. In some embodiments, before providing the selected broadcast media program to the primary display device 102, the media device 106 and/or control module 130 accesses the access card 139 to obtain the subscriber account information associated with the media device 106 and verifies or otherwise confirms the subscriber account information allows the selected broadcast media program to be viewed on the primary display device 102 before providing the selected broadcast media program stream to the primary display device 102. Alternatively, a viewer of the primary display device 102 may manipulate the remote control or other user input device 148 associated with the media device 106 to access the DVR feature provided by the media device 106 and select or otherwise identify a stored (or recorded) media program in the DVR 134 for viewing on the primary display device 102. In response, the media device 106 obtains the stored stream corresponding to the selected media program from the DVR 134 and provides that stored content stream to the primary display device 102. In some embodiments, the media device 106 stores media programs in the DVR 134 in the same uncompressed video encoding format as is provided to the primary display device 102.

In exemplary embodiments, the placeshifting process 200 continues by receiving an indication or request to placeshift or otherwise transfer the media content on the primary display device to a secondary device (task 208). In accordance with one or more embodiments, the control module 130 monitors the sensing arrangement 142 for an environmental condition indicative of a desire to placeshift media content. For example, the sensing arrangement 142 may be realized as a motion sensor with a particular gesture or another quantifiable motion pattern detectable by the sensing arrangement 142 being designated or otherwise predefined as indicating a desire to placeshift content (e.g., the designated placeshifting request gesture). The control module 130 may monitor the output of the sensing arrangement 142 to recognize, detect, or otherwise identify when the output of the sensing arrangement 142 indicates a gesture 150 by the viewer that matches the designated placeshifting request gesture. In alternative embodiments, the control module 130 may receive the indication or request to placeshift media content via the user input device 148, for example, in response to the viewer of the primary display device 102 manipulating the user input device 148 to access a menu or other GUI element presented by the media device 106 on the primary display device 102 to indicate the placeshifting request or otherwise select button or other input element of the user input device 148 to indicate the placeshifting request.

In accordance with one or more embodiments, the designated placeshifting request gesture may be configured or otherwise established by the viewer. For example, the viewer may manipulate the user input device 148 to initiate a gesture definition routine performed by the media device 106, and in response, the media device 106 may present or otherwise provide a graphical user interface (GUI) display on the primary display device 102 instructing the viewer to make the desired gesture that the viewer would like to designate as the placeshifting request gesture. Thereafter, the viewer may perform the desired gesture, wherein the control module 130 captures the output of the sensing arrangement 142 and generates or otherwise creates a signature for the gesture based on the output of the sensing arrangement 142. In this regard, the signature for the gesture represents the characteristics or pattern of the output generated by the sensing arrangement 142 in response to the gesture. The control module 130 stores or otherwise maintains the signature for the designated placeshifting request gesture in memory 146, wherein to detect or otherwise identify a placeshifting request, the control module 130 compares the output of the sensing arrangement 142 to the designated placeshifting request gesture signature in memory 146 and recognizes, detects, or otherwise identifies a placeshifting request when the output of the sensing arrangement 142 matches or is otherwise substantially equal to the stored gesture signature.

Still referring to FIG. 2, in response to receiving indication of a desire to placeshift the media program selected for viewing on the primary display device, in exemplary embodiments, the placeshifting process 200 continues by capturing or otherwise obtaining information or metadata the describes the current display status of the media program on the primary display device at or near the instant in time when the placeshifting request was received or otherwise detected (task 210). For example, the control module 130 may capture or otherwise obtain status information describing the state of the media program on the primary display device 102, such as, for example, a timestamp or other indicator of the portion of (or location within) the media program content stream that is currently being displayed and/or rendered on the primary display device 102 at the time the placeshifting request is received and an indication of the playback state of the media program (e.g., whether the media program was paused or playing). As described in greater detail below, in exemplary embodiments, the captured metadata or information describing the displayed state of the media program on the primary display device 102 is provided to the secondary device for correlating presentation of the placeshifted instance of the media program on the client device 104 with the instance of the media program presented on the primary display device 102.

In exemplary embodiments, the placeshifting process 200 continues by identifying or otherwise determining a destination device for placeshifting the media content from among the secondary devices paired with the media device (task 212). For example, the media device 106 may be paired with a plurality of different secondary display devices, wherein to determine the destination device, the media device 106 may access the network 108 to detect or otherwise identify which paired secondary devices are currently in the vicinity of the media device 106 and available for placeshifting. For example, the media device 106 may enable the network interface 140 in response to the placeshifting request and scan the network 108 for any devices connected to the network 108 that are broadcasting identification information that matches stored identification information in memory 146 that is associated with a paired secondary display devices. If the media device 106 identifies the client device 104 as the only paired secondary display device connected to the network 108, the media device 106 automatically identifies the client device 104 as the destination device. In other embodiments, when multiple paired secondary devices are detected on the network 108 and identified by the media device 106 as being available for placeshifting, the media device 106 may identify the client device 104 as the destination device in response to receiving an indication from the viewer.

In accordance with one or more embodiments, the media device 106 presents a GUI display on the primary display device 102 that lists or otherwise indicates the paired secondary devices identified by the media device 106 as being available for placeshifting, wherein the viewer manipulates the user input device 148 or performs an additional gesture 150 to select or otherwise indicate the client device 104 as the desired destination device from among the plurality of paired secondary devices. For example, the media device 106 may present a GUI display on the primary display device 102 that includes graphical representations of the available paired secondary devices arranged with a particular orientation with respect to one another, wherein the media device 106 identifies the client device 104 in response to detecting a gesture 150 via the sensing arrangement 142 that is in a direction that corresponds to the direction or orientation of the graphical representation of client device 104 on the primary display device 102 with respect to the graphical representations of the remaining available paired secondary devices on the primary display device 102.

After identifying the desired destination device, the placeshifting process 200 continues by automatically establishing a peer-to-peer communication session with the destination device using the stored identification information for the destination device (task 214). In this regard, the media device 106 automatically establishes the peer-to-peer communication session 109 without requiring any further manual interaction with the media device 106. For example, if the network 108 is a WLAN, the media device 106 may establish the peer-to-peer communication session 109 with the placeshifting application 110 on the client device 104 by creating a connection request using the stored identification information and/or authentication information for the client device 104 and transmitting or otherwise broadcasting the connection request on the network 108. Alternatively, if the network 108 is a Bluetooth PAN, the media device 106 may establish the peer-to-peer communication session 109 with the placeshifting application 110 on the client device 104 by enabling or otherwise powering the network interface 140 to transition the network interface 140 out of a lower power mode (e.g., an idle mode, a sleep mode, or the like) and establish the ad-hoc Bluetooth network 108. Thereafter, the media device 106 creates a connection request for the client device 104 using the stored identification information and transmits the connection request to the client device 104, which, in turn, may transition the Bluetooth transceiver or other network interface of the client device 104 from a low power mode to an active mode. In this regard, prior to the placeshifting request, the media device 106 need not be coupled to the network 108, and the network 108 between the media device 106 and the client device 104 may not even exist (e.g., in the case of an ad-hoc network). It should be noted that the subject matter described herein is not intended to be limited to any particular peer-to-peer communications protocol and/or any particular type of local network, and the examples described herein merely represent one potential implementation.

In exemplary embodiments, the placeshifting process 200 continues by encoding the media content selected for presentation on the primary display device into a different encoding format than the media content stream provided to the primary display device (task 216). For example, the media device 106 may obtain the media program stream for the selected media program currently being presented on the primary display device 102 and encode (or transcode) the media program stream into a different format suitable for communication via the network 108 and presentation on the client device 104. In this regard, the media device 106 encodes the media program provided to the primary display device 102 on-the-fly or on-demand and substantially in real-time in response to the placeshifting request. In one embodiment, when the media program being presented on the primary display device 102 is a broadcast media program, the control module 130 obtains the broadcast content stream for the media program from the receiver 132 and converts or transcodes the broadcast content stream for the selected media program to an encoded content stream with a format more suitable for communications over the network 108 and/or presentation on the client device 104. For example, the control module 130 may convert or otherwise transcode a broadcast stream received from the broadcast source 122 from the MPEG-2 encoding format to the H.264 encoding format. Alternatively, the control module 130 may convert or otherwise transcode the content stream being provided to the primary display device 102 from the uncompressed video encoding format to the H.264 encoding format. In some embodiments, the control module 130 may utilize stored identification information for the client device 104 to identify the new encoding format and/or file format that should be utilized for placeshifting the media program to that client device 104. For example, if the identification information for the client device 104 indicates the client device 104 is a particular type of device, a particular make and/or model, and/or a particular firmware version, the control module 130 may identify the desired encoding format and/or file format for that particular device configuration from among a plurality of possible encoding formats supported by the control module 130 and encode the media program in that identified format.

In some embodiments, encoding the selected media program into a different encoding format also includes the control module 130 packetizing or otherwise encapsulating the selected media program for communications via the network 108. For example, if the network 108 is a WLAN, the control module 130 may obtain the broadcast content stream for the selected media program from the receiver 132 and convert the broadcast content stream for the selected media program to an encoded content stream comprising a sequence of media content encapsulated in packets that are formatted in accordance with IEEE 802.11 specification. Similarly, if the network 108 is a PAN, the control module 130 may convert the content stream for the selected media program to an encoded content stream comprising a sequence of media content encapsulated in packets that are formatted in accordance with IEEE 802.15 specification.

After the selected media program is encoded with the proper format, the placeshifting process 200 continues by transferring or otherwise providing the encoded media content directly to the destination device via the peer-to-peer communication session and transferring or otherwise providing the metadata describing the status of the media program on the primary display device to the destination device for correlating presentation of the placeshifted media program with the media program on the primary display device (tasks 218, 220). In this regard, the media device 106 initiates a placeshifting session with the client device 104 and automatically transmits the encoded content stream corresponding to the media program presented on the primary display device 102 directly to the placeshifting application 110 on the client device 104 over the network 108 via the peer-to-peer communication session 109.

In accordance with one or more embodiments, in response to receiving the encoded content stream from the media device 106 via the peer-to-peer communication session 109, the placeshifting application 110 displays, on the display 112 of the client device 104, a GUI display including one or more GUI elements that may be manipulated by the user of the client device 104 to either initiate playback of the placeshifted media program on the client device 104 or store the placeshifted media program for subsequent viewing. In this regard, if the user of the client device 104 manipulates or otherwise selects a GUI element to begin playback of the media program on the display 112, the placeshifting application 110 utilizes the metadata describing the display status of the media program on the primary display device 102 to correlate the playback on the display 112. For example, if the display status metadata indicates that the media program on the primary display device 102 is paused at a particular location (or timestamp) within the media program at the time of the placeshifting request, the placeshifting application 110 may analyze or otherwise process the encoded stream such that the placeshifted media program is initially presented on the display 112 at (or as close as possible to) the same location (or timestamp) within the media program with playback in the paused state.

In other embodiments, if the display status metadata indicates that the media program on the primary display device 102 was not paused at the time of the placeshifting request, the placeshifting application 110 may analyze or otherwise process the encoded stream such that the placeshifted media program is initially presented on the display 112 at (or as close as possible to) a location (or timestamp) within the media program corresponding to the current time identified by the placeshifting application 110 and/or client device 104 with playback in the playing state. In this manner, the media program presented on the primary display device 102 may be effectively streamed directly to the client device 104 over the network 108 via the peer-to-peer communication session 109 and synchronized as close as possible to the concurrent presentation of the media program on the primary display device 102. In other embodiments, the presentation of the media program on the primary display device 102 may cease in response to the placeshifting request, in which case the placeshifted media program may be initially presented on the display 112 at (or as close as possible to) a location (or timestamp) within the media program corresponding to the time of the placeshifting request with playback in the playing state, such that the media program presented on the primary display device 102 is effectively transferred from the primary display device 102 to the client device 104.

In exemplary embodiments, after the user of the client device 104 has initiated playback or streaming of the placeshifted media program on the display 112, the media device 106 continues encoding and transmitting the remainder of the media program to the client device 104 via the peer-to-peer communication session 109. The placeshifting application 110 may continue by buffering the received encoded stream for the placeshifted media program and/or presenting the placeshifted media program on the display 112 until the user manipulates the placeshifting application 110 to terminate playback. In this regard, when the user manipulates the placeshifting application 110 to terminate playback, the placeshifting application 110 may notify the media device 106 to stop encoding and transmitting the media program before terminating the peer-to-peer communication session 109.

In alternative embodiments, if the user of the client device 104 manipulates or otherwise selects a GUI element to postpone playback of the media program, the placeshifting application 110 stores, buffers, or otherwise maintains the media program with the second encoding format in the memory 120. In this regard, the user of the client device 104 may subsequently manipulate the placeshifting application 110 to select or otherwise initiate playback of the placeshifted media program stored in memory 120. The placeshifting application 110 may also store or otherwise maintain, in memory 120 in association with the placeshifted media program, the received metadata describing the status of that media program on the primary display device 102 at the time of the placeshifting request to correlate the subsequent playback on the display 112. For example, if the metadata indicates that the media program on the primary display device 102 was at a particular location (or timestamp) within the media program at the time of the placeshifting request, the placeshifting application 110 may utilize the display status metadata to analyze or otherwise process the stored media program such that the placeshifted media program is initially presented on the display 112 at (or as close as possible to) the same location (or timestamp) within the media program that was displayed on the primary display device 102 at the time of the placeshifting request. In this regard, in some embodiments, after the user of the client device 104 has manipulated the placeshifting application 110 to store the placeshifted media program, the placeshifting application 110 may notify the media device 106 to encode and transmit portions of the media program that preceded placeshifting request and are stored in or otherwise buffered by the DVR 134, the memory 146 and/or the control module 130.

Still referring to FIG. 2, it should be noted that in some embodiments, the placeshifting process 200 may verify or otherwise determine that the subscriber account information associated with the media device allows for placeshifting of the media content presented on the primary display device to secondary devices. For example, in response to a placeshifting request, the media device 106 and/or control module 130 may check the access card 139 to verify or otherwise confirm the subscriber account information associated with the primary display device 102 allows the selected broadcast media program to be viewed on a secondary device before providing the selected broadcast media program stream to the client device 104. Additionally, the media device 106 and/or control module 130 may verify or otherwise confirm that placeshifting of the selected media program is authorized by its associated content provider prior to placeshifting the selected media program. Furthermore, it should be noted that in some embodiments, once media content is placeshifted to the client device 104, the primary display device 102 may be utilized to present other media content. For example, while a broadcast media program is being streamed to the client device 104 from the media device 106, another viewer of the primary display device 102 may manipulate the user input device 148 to initiate presentation of a stored media program on the DVR 134 on the primary display device 102.

Figure 3:
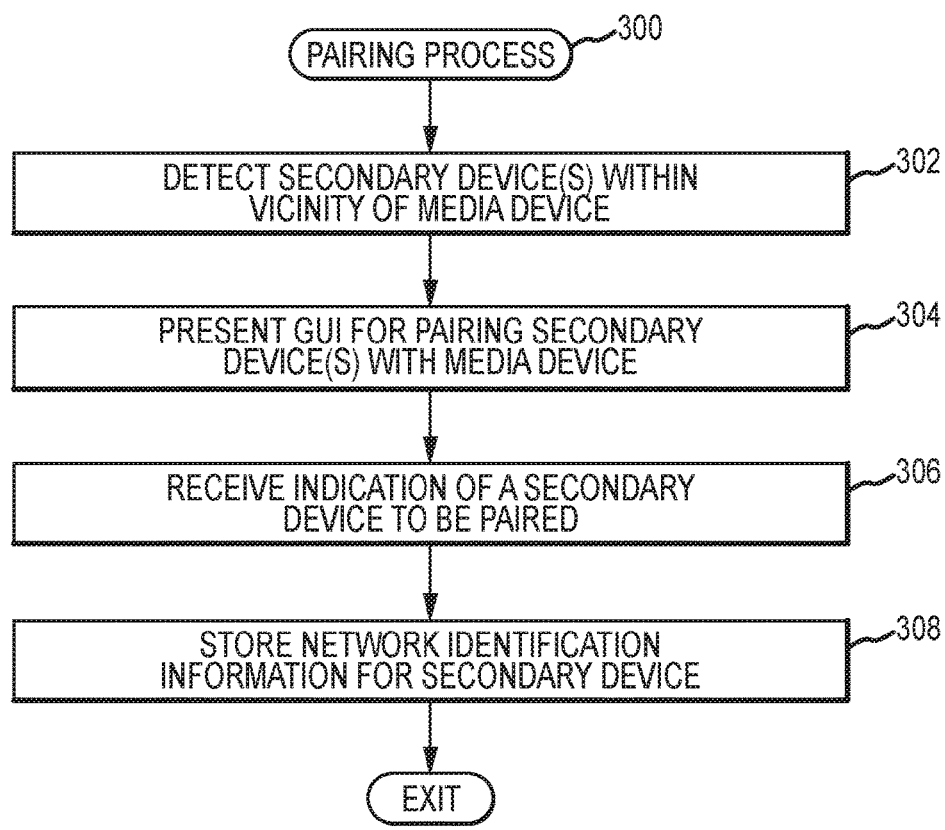
FIG. 3 is a flowchart of an exemplary pairing process suitable for use with the media system of FIG. 1.

FIG. 3 depicts an exemplary embodiment of a pairing process 300 suitable for implementation by media device in a media system, such as media device 106, in conjunction with the placeshifting process 200 of FIG. 2 to establish an association between a secondary display device and a media device that supports automatically placeshifting media content from the primary display device to the paired secondary device substantially in real-time or on-demand. The various tasks performed in connection with the illustrated process 300 may be implemented using software, hardware, firmware, or any combination thereof. For illustrative purposes, the following description may refer to elements mentioned above in connection with FIG. 1. In practice, portions of the pairing process 300 may be performed by different elements of the media device 106, such as, for example, the control module 130, the receiver interface 132, the display interface 136, the network interface 140, the memory 146, the sensing arrangement 142 and/or the I/O interface 144. It should be appreciated that the pairing process 300 may include any number of additional or alternative tasks, the tasks need not be performed in the illustrated order and/or the tasks may be performed concurrently, and/or the pairing process 300 may be incorporated into a more comprehensive procedure or process having additional functionality not described in detail herein. Moreover, one or more of the tasks shown and described in the context of FIG. 3 could be omitted from a practical embodiment of the pairing process 300 as long as the intended overall functionality remains intact.

Referring to FIG. 3, and with continued reference to FIGS. 1-2, in some embodiments, the pairing process 300 may be initialized by a viewer of the primary display device 102 manipulating the user input device 148 or otherwise making a gesture 150 to provide an indication to the media device 106 of a desire to pair a secondary display device with the media device 106. For example, the viewer may manipulate the user input device 148 to access a GUI menu feature provided by the media device 106 and manipulate or otherwise select a GUI element that initiates the pairing process 300. The pairing process 300 begins by discovering, detecting or otherwise identifying secondary devices proximate to or otherwise within the vicinity of the media device and presenting or otherwise displaying a GUI display that indicates the detected secondary devices (tasks 302, 304). For example, in response to the viewer indicating a desired to pair a secondary device with the media device 106, the control module 130 may enable or otherwise operate the network interface 140 to connect to the network 108 (e.g., in the case of WLAN) or establish the network 108 (e.g., in the case of an ad-hoc PAN such as a Bluetooth network). Thereafter, the media device 106 may scan the network 108 to discover, detect or otherwise identify secondary devices connected to the network 108, such as, client device 104. The media device 106 may obtain, for each detected device, unique identification information associated with that detected device that is broadcasted or otherwise made available by that respective detected device. Using the identification information, the media device 106 may generate or otherwise provide a GUI display on the primary display device 102 that includes a list, menu, or some other graphical representation of the detected devices within the vicinity of the media device 106.

In exemplary embodiments, the pairing process 300 continues by receiving an indication of the desired secondary device to be paired with the media device and storing or otherwise maintaining network identification information for that secondary device (tasks 306, 308). For example, a viewer of the primary display device 102 may manipulate the user input device 148 or otherwise making a gesture 150 to select the client device 104 from among the list of secondary devices detected by the media device 106 and thereby provide an indication to the media device 106 of a desire to pair the client device 104 with the media device 106. In response, the media device 106 stores or otherwise maintains, the unique identification information associated with client device 104 in memory 146 in association with an indication that the stored network identification information corresponds to a paired secondary device. Additionally, the media device 106 may utilize the identification information for the client device 104 to contact the placeshifting application 110 via the network 108 to obtain additional information for facilitating/establishing the peer-to-peer communication session 109, such as, for example, authentication information for communicating with the placeshifting application 110. After the pairing process 300 is completed, the media device 106 may utilize the stored identification information to detect or otherwise identify the client device 104 as a possible destination device (e.g., task 212) in conjunction with the placeshifting process 200, as described above.

Figure 4:
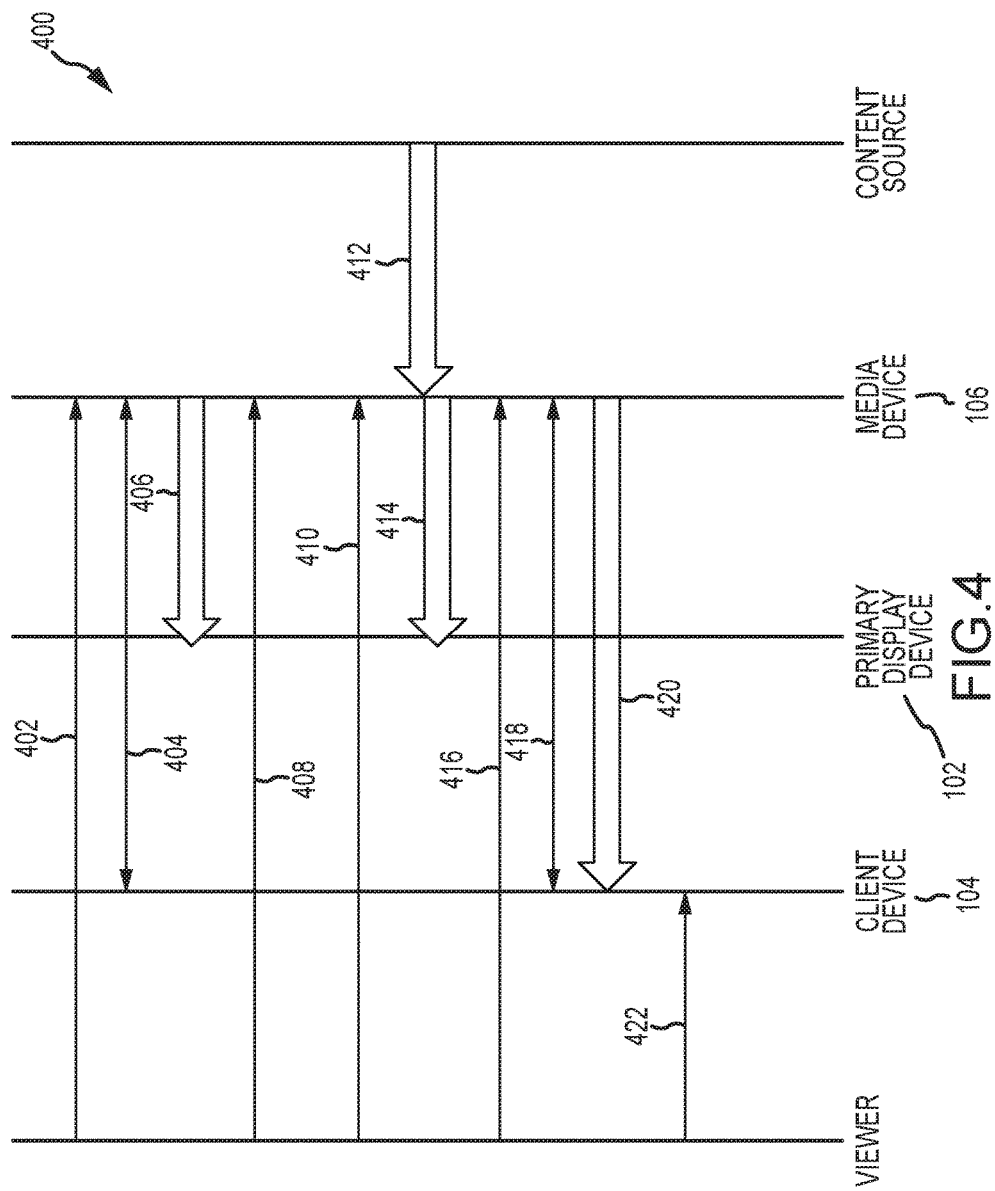
FIG. 4 is a diagram illustrating a sequence of communications within the media system of FIG. 1 in accordance with one exemplary embodiment of the placeshifting process of FIG. 2.

FIG. 4 depicts an exemplary sequence 400 of communications within the media system 100 of FIG. 1 in accordance with an exemplary embodiment of the placeshifting process 200 described above. As described above in the context of the pairing process 300 of FIG. 3, the sequence 400 begins with the media device 106 receiving 402 an indication of a desire to pair a secondary display device with the media device 106 in response to a viewer of the primary display device 102 manipulating the user input device 148 or making a particular gesture 150. In response to receiving the indication, the media device 106 communicates 404 with the client device 104 via the network 108 by scanning the network 108 to detect the presence of the client device 104 and obtain identification information for the client device 104 (e.g., task 302). Thereafter, the media device 106 presents or otherwise provides 406 a GUI display on the primary display device 102 that lists or otherwise indicates the client device 104 as being detected on the network 108 or otherwise in the vicinity of the media device 106 (e.g., task 304). Subsequently, the media device 106 receives 408 an indication of a desire to pair the client device 104 (e.g., task 306) in response to the viewer further manipulating the user input device 148 or making another gesture 150 to select the client device 104 indicated on the primary display device 102. Thereafter, the media device 106 stores or otherwise maintains the obtained identification information that is unique to the client device 104 in memory 146 to maintain the association with the client device 104.

After the client device 104 has been paired with the media device 106, the media device 106 may receive 410, from the viewer, a selection or indication of a particular media program available from the content source (e.g., broadcast source 122 or DVR 134) for presentation on the primary display device 102, wherein in response to identifying the selected media program (e.g., task 204), the media device 106 obtains 412 the content stream for the selected media program from the content source and provides 414 the content stream for the selected media program to the primary display device 102 in the uncompressed video encoding format (e.g., task 206). While the media program is being presented on the primary display device 102, the media device 106 receives 416 an indication of a desire to placeshift the media program from the primary display device 102 to a paired secondary display device (e.g., task 208). For example, as described above, the sensing arrangement 142 may detect a gesture 150 by a viewer of the primary display device 102 that matches a predefined pattern of movement that is designated as representing a desire to placeshift the media program presented on the primary display device 102.

In response to receiving 416 a placeshifting request, the media device 106 identifies the client device 104 as the destination device (e.g., task 212) and automatically establishes 418 the peer-to-peer communication session 109 with the client device 104 using the unique identification information stored in memory 146 for the client device 104 (e.g., task 214), as described above. The media device 106 encodes the content stream obtained 412 from the content source into an encoding format suitable for transmission over the network 108 and subsequent display on the client device 104 (e.g., task 216) and automatically transfers or otherwise transmits 420 the encoded stream corresponding to the media program presented on the primary display device 102 to the client device 104 over the network 108 via the peer-to-peer communication session 109. Thereafter, a user of the client device 104 may interact 422 with the client device 104 (e.g., by manipulating GUI elements presented by the placeshifting application 110) to initiate playback or storage of the placeshifted media program by the client device 104 in a similar manner as described above. Additionally, as described above, the media device 106 may capture or otherwise obtain metadata describing the display status of the selected media program on the primary display device 102 when the placeshifting request is received 416 and provide that metadata to the client device 104 to correlate the subsequent playback of the placeshifted media program on the client device 104 with the presentation on the primary display device 102. For example, the display status metadata may be utilized to correlate the playback on the client device 104, such that the placeshifted media program is presented on the client device 104 concurrently and/or substantially in sync with the instance of the media program on the primary display device 102. Alternatively, playback of the placeshifted media program on the client device 104 may resume at the same location within the media program that was presented on the primary display device 102 when the media device 106 received 416 placeshifting request.

Figure 5:
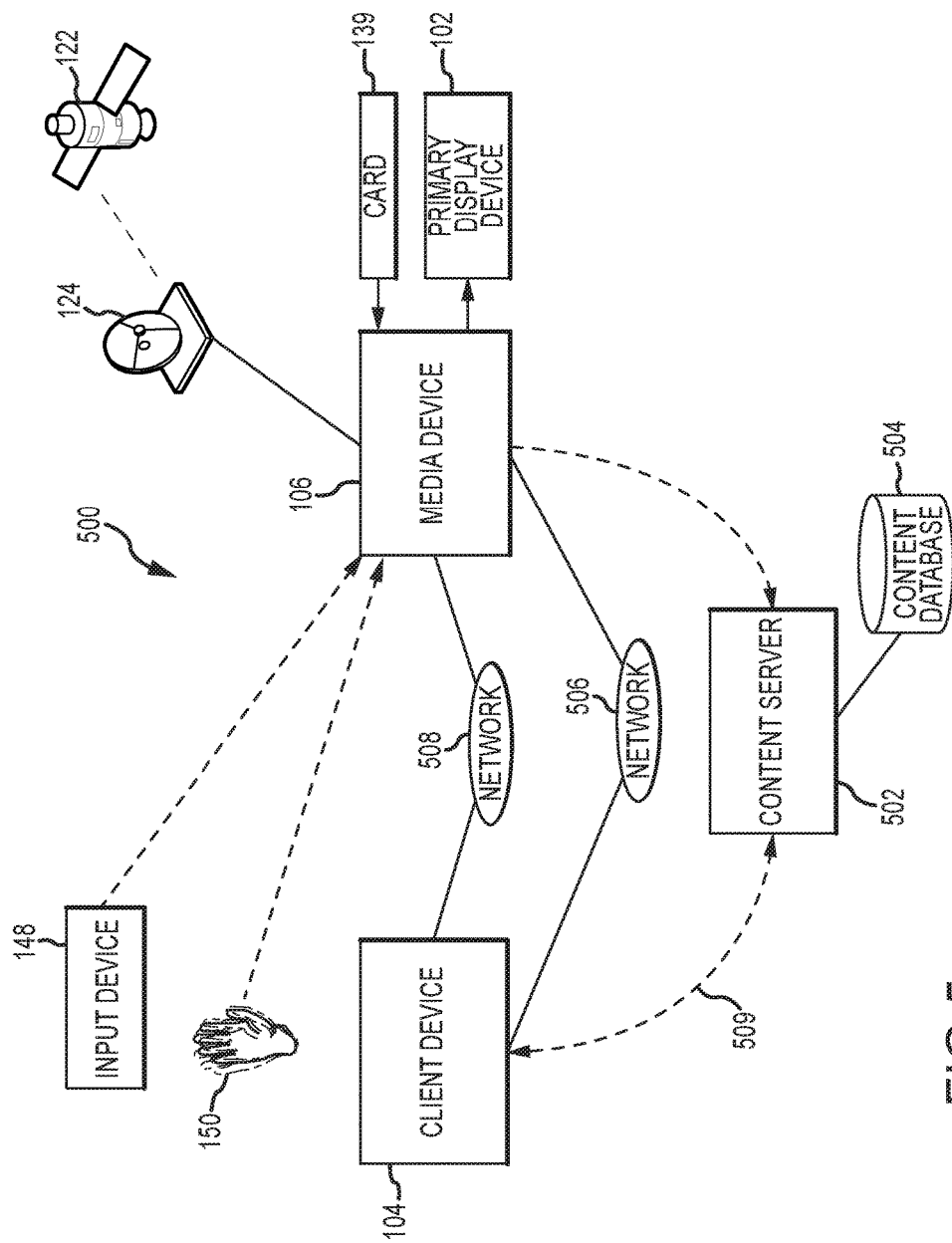
FIG. 5 is a block diagram of a media system in accordance with one or more embodiments.

FIG. 5 depicts another embodiment of a media system 500 configured to support transferring or otherwise placeshifting a media program (or media content) available for presentation on a primary display device 102 via a media device 106 to a client device 104 that has been paired with the media device 106. Various components, features, functions, and/or other details of the elements of the media system 500 are similar to their counterpart elements described above in the context of the media system 100 of FIG. 1, and accordingly, such common components, features, functions, and/or other details will not be redundantly described in the context of FIG. 5.

In media system 500, rather than the media device 106 establishing a peer-to-peer communication session with the client device 104 via a network 508 (e.g., network 108), the media device 106 provides information identifying the destination device (e.g., client device 104) and the media program presented on the primary display device 102 to a content server 502 coupled to another network 506. The content server 502 then utilizes the information received from the media device 106 to automatically establish a peer-to-peer communication session 509 with the client device 104 via network 506 and transfer or otherwise transmit an encoded stream of content corresponding to the identified media program to the client device 104 via the peer-to-peer communication session 509 with the client device 104 over network 506. In this regard, the network 506 may be physically and/or logically distinct from the network 508 used by the media device 106 to establish the pairing with the client device 104. For example, the network 508 may be realized as an ad-hoc network, a Bluetooth network, a PAN, or a WLAN or the like, while the network 506 is realized as the Internet, a cellular network, a broadband network, a wide area network, or the like.

The content server 502 may be implemented with any sort of server computer system or data processing system that is based upon any processor, architecture and/or operating system, and will typically include a processing system (or processing hardware), a data storage element (or memory), and various input/output features. Additionally, the content server 502 may be implemented using one or more dedicated or shared hardware servers, one or more virtual servers features as part of a "cloud computing" service, or any other suitable combination or cluster of servers. In exemplary embodiments, the content server 502 is coupled to the various content providers within the media system 500, such as the broadcast source 122, to obtain media content available for presentation on the primary display device 102. In this regard, the content server 502 may include or otherwise be coupled to a database 504, wherein the content server 502 copies, records, or otherwise stores instances of media programs available from the content sources within the media system 500. For example, for a broadcast content source 122, the content server 502 may record or otherwise copy individual content streams corresponding to the individual media programs broadcast on the various broadcast channels supported by the broadcast content source 122 into individual content files stored on the content database 504. Depending on the embodiment, the content server 502 may store the content streams in content files having the same encoding format as that used by the broadcast source 122 to provide the media programs to the media device 106 (e.g., the broadcast encoding format), or alternatively, the content server 502 may convert or transcode content streams received from the broadcast source 122 into content files having a different encoding format other than the broadcast encoding format. In some embodiments, multiple instances of a particular media program may be stored in the content database 504 using different content files with each content file having a different encoding format.

Figure 6:
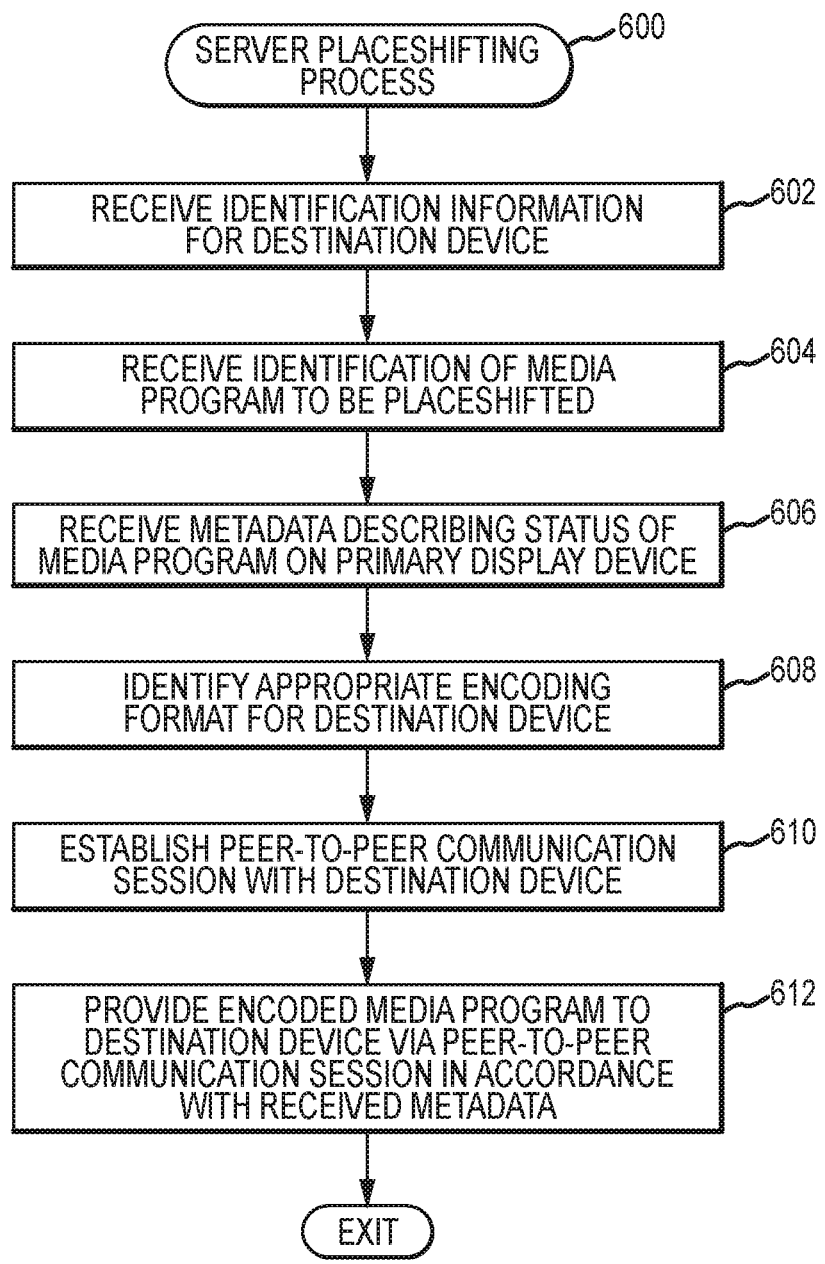
FIG. 6 is a flowchart of an exemplary server placeshifting process suitable for use with the media system of FIG. 5.

FIG. 6 depicts an exemplary embodiment of a server placeshifting process 600 suitable for implementation by a server in a media system, such as content server 502, to placeshift media content available for presentation on a primary display device to a secondary display device paired with a media device associated with the primary display device. The various tasks performed in connection with the illustrated process 600 may be implemented using software, hardware, firmware, or any combination thereof. For illustrative purposes, the following description may refer to elements mentioned above in connection with FIGS. 1-5. In practice, portions of the server placeshifting process 600 may be performed by different elements of the media system 500, such as, for example, the content server 502, the content database 504, the media device 106 and/or the client device 104. It should be appreciated that the server placeshifting process 600 may include any number of additional or alternative tasks, the tasks need not be performed in the illustrated order and/or the tasks may be performed concurrently, and/or the server placeshifting process 600 may be incorporated into a more comprehensive procedure or process having additional functionality not described in detail herein. Moreover, one or more of the tasks shown and described in the context of FIG. 6 could be omitted from a practical embodiment of the server placeshifting process 600 as long as the intended overall functionality remains intact.

Still referring to FIGS. 5-6, in a similar manner as described above in the context of FIG. 1-4, in exemplary embodiments, prior to execution of the server placeshifting process 600, the media device 106 detects or otherwise identifies the client device 104 on the network 508 and establishes an association with the client device 104, for example, by performing pairing process 300. As described above, during the pairing process, the media device 106 obtains, from the client device 104 via network 508, unique identification information associated with the client device 104 that may be utilized to locate the client device 104 on the network 506 along with any authentication information or other information that may be required to establish a peer-to-peer communication session 509 with the client device 104 via network 506, and the media device 106 stores the obtained information (e.g., in memory 146). Thereafter, during presentation of a media program on the primary display device 102, the media device 106 identifies or otherwise receives a placeshifting request in a similar manner as described above, for example, by detecting a placeshifting request gesture 150. In response to receiving the placeshifting request, the media device 106 obtains metadata describing the display status of the media program on the primary display device 102 and identifies the client device 104 as the desired destination device. Thereafter, the media device 106 obtains the stored identification information associated with the client device 104 from memory 146 and transmits or otherwise provides, to the content server 502 (e.g., via network 506), the stored identification information and/or authentication information for the client device 104 along with information identifying the media program currently being presented on the primary display device 102 and the obtained display status metadata.

Referring to FIGS. 5-6, the server placeshifting process 600 begins with the content server receiving, from the media device, identification information for the destination device along with identification information and display status metadata for the media program on the primary display device (tasks 602, 604, 606). In exemplary embodiments, the server placeshifting process 600 continues with the content server determining or otherwise identifying the appropriate encoding format for the instance of the media program to be provided to the destination device (task 608). In this regard, the content server 502 may determine the appropriate encoding format based on the identification information for the client device 104 and/or characteristics of the network 506. For example, the content server 502 may determine a device type (e.g., mobile phone, tablet computer, desktop computer, or the like) of the client device 104 based on the identification information for the client device 104, and thereby identify the appropriate content file type (or file extension) for subsequent display and/or rendering by that type of secondary display device. Additionally, the content server 502 may determine the appropriate encoding resolution (or quality) based on the device type and/or performance characteristics of the network 506 (e.g., the amount of bandwidth accessible and/or throughput achievable over the network 506 between the content server 502 and the client device 104). In some embodiments, the content server 502 may support adaptive bitrate streaming to the client device 104 using feedback from the client device 104 to increase and/or decrease the resolution.

In exemplary embodiments, the content server 502 accesses the content database 504 to obtain an instance of the identified media program in the identified encoding format. If the identified media program is not available in the desired encoding format, the content server 502 converts or otherwise transcodes an instance of the identified media program in the content database 504 to the desired encoding format. In the case of a live broadcast media program that may not be available in the content database 504, the content server 502 may buffer the broadcast media program received from the broadcast content source 122 and convert the broadcast media program from the broadcast encoding format used by the broadcast content source 122 (e.g., MPEG-2) to the desired encoding format for placeshifting to the client device 104 (e.g., H.264) on-the-fly and substantially in real-time such that the broadcast media program is effectively being streamed to the client device 104 via the content server 502.

After identifying the appropriate encoding format for placeshifting the identified media program to the destination device, the server placeshifting process 600 continues by automatically establishing a peer-to-peer communication session with the destination device and transferring, transmitting, or otherwise providing the identified media program to the destination device to the destination device via the peer-to-peer communication session in the identified encoding format (tasks 610, 612). In a similar manner as described above, the content server 502 utilizes the identification information for the client device 104 to locate the client device 104 on the network 506 and automatically establishes a peer-to-peer communication session 509 with the placeshifting application 110 on the client device 104 by using the identification information and/or authentication information to transmit a connection request to the client device 104 and/or authenticate the content server 502 with the placeshifting application 110. Once the content server 502 obtains the identified media program in the desired encoding format, the content server 502 encapsulates or otherwise encodes the media program into an encoded content stream that is transmitted or otherwise transferred to the client device 104 via the peer-to-peer communication session 509.

In one or more exemplary embodiments, the content server 502 provides the encoded media program to the client device 104 in accordance with the metadata describing the display status of the media program on the primary display device 102. In this regard, the content server 502 may process the media content so that the encoded stream provided to the client device 104 begins or otherwise initializes at (or as close as possible to) the location (or timestamp) within the media program corresponding to when the placeshifting request was received by the media device 106. For example, when encapsulating the media program into the encoded content stream, the content server 502 may obtain the content file for the media program from the content database 504 and truncate or otherwise disregard the portion of the content file corresponding to locations within the media program preceding when the placeshifting request was received, such that the encoded content stream begins at the location when the placeshifting request was received. In alternative embodiments, the content server 502 may merely provide the metadata describing the display status of the media program on the primary display device 102 to the placeshifting application 110, which, in turn, utilizes the display status metadata to control playback of the placeshifted media program on the client device 104.

FIG. 7 depicts an exemplary sequence 700 of communications within the media system 500 of FIG. 5 in accordance with an exemplary embodiment of the server placeshifting process 600 after the client device 104 has been paired with the media device 106 via the network 508. Again, after the client device 104 has been paired with the media device 106, the media device 106 may receive 702, from the viewer, a selection or indication of a particular media program available from a content source (e.g., broadcast source 122 or DVR 134) for presentation on the primary display device 102. After identifying the selected media program, the media device 106 obtains 704 a content stream for the selected media program from the content source and provides 706 the content stream for the selected media program to the primary display device 102 in the appropriate encoding format. Thereafter, while the media program is being presented on the primary display device 102, the media device 106 receives 708 a placeshifting request from the viewer (e.g., by detecting a gesture 150 by the viewer that matches a designated placeshifting request gesture).

In response to receiving 708 the placeshifting request, the media device 106 identifies the client device 104 as the destination device, captures metadata describing the display status of the selected media program provided 706 to the primary display device 102, and transmits or otherwise provides 710 the stored identification information for the client device 104 along with the display status metadata and an identification of the media program to be placeshifted to the content server 502 (e.g., via network 506). Additionally, in some embodiments, the information provided 710 to the content server 502 may also include subscriber account information obtained by the media device 106 from the access card 139. In this regard, before placeshifting content to the client device 104, the content server 502 may confirm or otherwise verify that placeshifting the identified media program to the client device 104 is authorized or otherwise allowed based on the subscriber account information. For example, subscriber account information for the subscriber associated with the media device 106 may restrict what media programs may be placeshifted, wherein the content server 502 enforces those restrictions before providing content to the client device 104. In this regard, the subscriber account information may allow media programs stored on the subscriber's DVR 134 to be placeshifted while restricting placeshifting of live broadcast media programs from the broadcast content source 122, wherein the content server 502 analyzes the subscriber account information received from the media device 106 and prevents placeshifting to the client device 104 when the identified media program is currently being broadcast by the broadcast content source 122. It should be noted that there are numerous possibilities for how subscriber account information can be used to regulate or otherwise restrict placeshifting, and the subject matter described herein is not intended to be limited to any particular implementation.

In the illustrated embodiment of FIG. 7, after the content server 502 receives 710 information from the media device 106 determines placeshifting the identified media program to the client device 104 is authorized for the subscriber (or customer) associated with the media device 106, the content server 502 accesses the content database 504 to obtain 712 an instance of the identified media program. As described above in the context of FIG. 6, the content server 502 may identify the appropriate encoding format for the client device 104 based on the identification information for the client device 104 and/or characteristics of the network 506 and select the instance of the identified media program in the content database 504 that is already encoded with that identified encoding format. In other embodiments, if the content database 504 does not maintain an instance of the identified media program in the desired encoding format, the content server 502 may convert an instance of the identified media program from the content database 504 into a content stream with the desired encoding format (e.g., by decoding then re-encoding into the desired encoding format).

As described above, the content server 502 utilizes the identification information for the client device 104 on the network 506 to automatically establish 714 the peer-to-peer communication session 509 with the placeshifting application 110 on the client device 104 via the network 506 and transmit or otherwise provide 716 the encoded content stream for the identified media program with the desired encoding format to the placeshifting application 110 via the peer-to-peer communication session 509. Thereafter, the viewer may manipulate or otherwise interact 718 with the placeshifting application 110 on the client device 104 to initiate playback of the placeshifted media program or store the placeshifted media program on the client device 104 for subsequent viewing. As described above, the display status metadata captured by the media device 106 may be utilized to correlate the playback on the client device 104, such that the placeshifted media program may be presented on the client device 104 concurrently and/or substantially in sync with the instance of the media program on the primary display device 102. Alternatively, playback of the placeshifted media program on the client device 104 may resume at the same location within the media program that was presented on the primary display device 102 at the time of the placeshifting request, such that the media program is effectively transferred from the primary display device 102 to the client device 104 via the content server 502.

By virtue of the subject matter described herein, a media program presented on a primary display device, such as a television, maybe transferred or placeshifted from the primary display device to a secondary display device substantially in real-time via a "on-demand" peer-to-peer communication session established with the secondary display device in response to a placeshifting request. In this regard, by pairing the secondary display device with the media device associated with the primary display device, identification information for the secondary display device may be utilized to establish the peer-to-peer communication session and facilitate placeshifting with limited user interaction required. For example, as described above, when the media device associated with the primary display device is capable of detecting or otherwise recognizing a placeshifting request gesture, the viewer of the primary display device merely performs the placeshifting request gesture to initiate transfer of the media program concurrently being presented on the primary display device to the paired secondary display device. To begin playback of the placeshifted media program on the secondary display device, the viewer does not need to manually input login information or other authorization information, manually locate or otherwise select the media program for presentation, or manually advance a selected media program to a location within the media program to which the viewer has already progressed. Rather, a placeshifting application on the secondary display device may allow the viewer to control playback or otherwise manage the placeshifted media program on the secondary display device with reduced manual overhead (i.e., without requiring user logins, user selection of the media program, fast-forwarding and/or rewinding, etc.).

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method of placeshifting a media program, the method comprising:

receiving, by a server, identification information for a client device from a media device paired with the client device, the client device being coupled to a network and the media device being coupled to a primary display device;

receiving, by the server from the media device, a request to transfer the media program available for presentation on a primary display device in a first format via the media device; and in response to the request:

establishing, by the server, a peer-to-peer communication session between the client device and the server over the network using the identification information;

determining, by the server, a second format for an encoded content stream corresponding to the media program, wherein the second format is different from the first format; and transferring, by the server, the encoded content stream corresponding to the media program from the server to the client device via the peer-to-peer communication session.

2. The method of claim 1, further comprising:
determining, by the server, a device type for the client device based on the identification information for the client device, wherein:
determining the second format comprises the server determining the second format based on the device type.

3. The method of claim 1, further comprising:
determining, by the server, one or more performance characteristics of the network between the server and the client device, wherein:
determining the second format comprises the server determining the second format based on the one or more performance characteristics of the network.

4. The method of claim 1, wherein transferring the encoded content stream comprises the server supporting adaptive bitrate streaming to the client device using feedback from the client device.

5. The method of claim 1, further comprising converting, by the server, a content stream corresponding to the media program from a content source into a content file having the second format.

6. The method of claim 1, the first format corresponding to a broadcast encoding format, the method further comprising the server converting a content stream received from a broadcast source into a content file having the second format.

7. The method of claim 1, further comprising storing, by the server in a database, multiple instances of the media program using different content files, wherein each content file has a different encoding format.

8. The method of claim 1, wherein receiving the identification information comprises the server receiving the identification information from the media device after the client device has been paired with the media device.

9. The method of claim 1, further comprising:
providing, by the media device, a first content stream corresponding to the media program to the primary display device, the first content stream having the first format; and
converting, by the server, the first content stream from the first format to the second format prior to the transferring the encoded content stream having the second format via the peer-to-peer communication session to the client device.

10. The method of claim 1, further comprising receiving, by the server from the media device, metadata describing a display status of the media program on the primary display device, wherein the server transfers the encoded content stream to the client device in accordance with the metadata.

11. The method of claim 10, wherein the encoded content stream transferred to the client device begins at a location within the media program corresponding to when a placeshifting request was received by the media device.

12. The method of claim 11, wherein transferring the encoded content stream comprises the server obtaining a content file and disregarding a portion of the content file corresponding to locations within the media program preceding the placeshifting request.

13. The method of claim 1, further comprising:
receiving, by the server from the media device, metadata describing a display status of the media program on the primary display device; and
providing, by the server, the metadata to an application on the client device, wherein the application utilizes the metadata to control playback of the media program on the client device.

14. The method of claim 1, further comprising verifying, by the server, placeshifting the media program is authorized based on the identification information prior to transferring the encoded content stream.

15. A system comprising:
a media device coupled to a primary display device and configured to obtain identification information for a client device coupled to a network and receive a request to transfer a media program available for presentation on the primary display device via the media device in a first format; and
a server coupled to the network to receive the identification information and the request from the media device, establish a peer-to-peer communication session between the client device and the server over the network using the identification information, determine a second format for an encoded content stream corresponding to the media program, and transfer the encoded content stream corresponding to the media program and having the second format from the server to the client device via the peer-to-peer communication session over the network, wherein the second format is different from the first format.

16. The system of claim 15, wherein the server is configured to receive metadata describing a display status of the media program on the primary display device and transfer the encoded content stream to the client device in accordance with the metadata.

17. The system of claim 15, further comprising a database coupled to the server, wherein the server is configured to store different content files in the database corresponding to multiple instances of the media program, wherein each content file has a different encoding format.

18. The system of claim 17, the first format corresponding to a broadcast encoding format, wherein the server is configured to convert a content stream received from a broadcast source in the broadcast encoding format into the different content files having the different encoding formats.

19. A method of placeshifting a media program, the method comprising:
associating a client device with a media device coupled to a primary display device;
receiving, by a server from the media device, identification information for the client device based on the association with the media device;
providing the media program to the primary display device via the media device in a first format;
detecting, by the media device, a placeshifting request gesture while providing the media program to the primary display device; and
in response to the placeshifting request gesture:
receiving, by the server, a request to transfer the media program and metadata describing a display status of the media program on the primary display device from the media device;
establishing, by the server, a peer-to-peer communication session between the client device and the server over a network using the identification information;

determining, by the server, a different encoding format than the first format for an encoded content stream corresponding to the media program; and transferring, by the server via the peer-to-peer communication session, the encoded content stream corresponding to the media program and having the different encoding format from the server to the client device in accordance with the metadata.

\* \* \* \* \*